United States Patent [19]
Bailey

[11] 3,800,270
[45] Mar. 26, 1974

[54] PIEZOELECTRIC ACOUSTICAL TRANSDUCER FOR TRANSMITTING AND RECEIVING

[75] Inventor: James R. Bailey, Milwaukee, Wis.

[73] Assignee: Johnson Service Company, Milwaukee, Wis.

[22] Filed: July 12, 1972

[21] Appl. No.: 271,019

[52] U.S. Cl.............. 340/1 R, 340/3 D, 340/258 A
[51] Int. Cl.............................................. G01s 9/68
[58] Field of Search.............. 340/1 R, 3 D, 8 L, 10, 340/258 A; 310/9.7, 9.8

[56] References Cited
UNITED STATES PATENTS

| 3,525,976 | 8/1970 | Wilcox et al.......................... 340/3 D |
| 3,004,425 | 10/1961 | Henry.................................... 310/9.8 |
| 3,638,210 | 1/1972 | Hankins et al................... 340/258 A |
| 3,297,968 | 1/1967 | Fowler.................................. 310/9.8 |
| 3,689,781 | 9/1972 | Kawada................................ 310/9.8 |

Primary Examiner—Richard A. Farley
Attorney, Agent, or Firm—Johnson, Dienner, Emrich, Verbeck & Wagner

[57] ABSTRACT

A piezoelectric acoustical transducer for operating simultaneously as an acoustical transmitter and an acoustical receiver includes a piezoelectric element having a pair of discrete conductive elements disposed on a first surface, serving as input and output electrodes, respectively, for the transducer and a common electrode disposed on a second surface of the element; drive signals applied between the input and common electrodes effect the generation of acoustical signals for radiation from the transducer, and acoustical signals impinging on the transducer produce output signals between the output electrode and the common electrode.

9 Claims, 5 Drawing Figures

PIEZOELECTRIC ACOUSTICAL TRANSDUCER FOR TRANSMITTING AND RECEIVING

BACKGROUND OF THE INVENTION

1. Field of the Invention.

This invention relates to motion detection systems, and more particularly, to acoustical transducers for use in such systems.

2. Description of the Prior Art.

Many motion detection systems of the prior art employ Doppler apparatus including a transmitter for generating acoustical energy of a predetermined frequency for radiation into an area to be protected and a receiver for detecting such portions of the radiated energy as may be reflected off objects within the protected area.

In accordance with the principles of the Doppler effect, whenever the radiated energy is reflected off a moving object within the effective radiation field of the system, such reflected energy will be shifted in frequency and phase, producing Doppler signals of frequencies that are substantially lower or higher than the frequency of the radiated energy.

The receiver includes a signal detecting circuit generally tuned to detect only signals at Doppler frequencies which are produced whenever an object is moving within the protected area, and an alarm indicator circuit controlled by the signal detecting circuit to provide an alarm indication whenever signals at Doppler frequencies are detected by the signal detecting circuit.

The transmitter of such Doppler radar apparatus includes an acoustical transducer driven by a suitable signal generator to generate acoustical signals at ultrasonic frequencies for radiation into the protected area. The receiver includes a further acoustical transducer which is responsive to acoustical signals reflected back to the location of the receiver transducer to provide electrical output signals at the frequency of the reflected signals for the signal detecting circuit.

Heretofore, such acoustical transducers have been primarily designed to be used in pairs, one transducer being used as a transmitter of ultrasonic waves and the other transducer being used as a receiver. Thus, prior art Doppler systems have required two separate acoustical transducers to permit transmission and reception of acoustical signals.

SUMMARY OF THE INVENTION

The present invention provides a piezoelectric acoustical transducer for use in motion detection systems, such as intrusion alarm systems, which serves both as an acoustical transmitter and an acoustical receiver for simultaneously transmitting acoustical signals into an area to be protected and receiving acoustical signals reflected off objects within the protected area.

In an exemplary embodiment, the transducer is comprised of a piezoelectric element having conductive material disposed on first and second surfaces thereof. The conductive material on the first surface is scored to provide two electrically isolated conductive segments on the first surface.

One portion of the first conductive surface serves as an input electrode for the transducer, and the other portion of the first conductive surface serves as an output electrode for the transducer. The conductive material on the second surface of the piezoelectric element serves as a common electrode for the transducer.

The input electrode and the common electrode of the transducer are connected to an output circuit of a signal generator which supplies drive signals at ultrasonic frequencies to the transducer. The drive signals applied to the transducer input electrode cause the piezoelectric element to flex at the frequency of the drive signals to thereby produce acoustical signals for radiation into the protected area.

The portion of the transmitted acoustical energy which is reflected off mobile or immobile objects within the protected area and returned to the location of the transducer impinges upon the piezoelectric element causing amplitude modulation of the flexing due to the drive signal. Electrical output signals at the frequency of the reflected signals are thereby produced between the output electrode and the common electrode of the transducer in addition to the replica of the original drive frequency. The reflected acoustical energy may include signals at the transmitted frequency and signals at Doppler shifted frequencies if there is a moving object within the effective radiation field of the system, including the area to be protected. A signal detecting circuit connected between the output electrode and the common electrode detects the output signals provided thereat.

In accordance with one embodiment for Doppler radar motion detection apparatus provided by the present invention, the signal detecting circuit includes a differential amplifier circuit, which may be embodied as a common mode rejection amplifier, which receives reflected signals at both Doppler frequencies and at the transmitted frequency at a first input thereof. Signals at the transmitted frequency are extended from the output of the signal generator to a second output of the differential amplifier circuit. The signals received at the first input of the differential amplifier circuit are inverted and added to the signals extended to the second input of the differential amplifier circuit. Accordingly, the out-of-phase signals at the transmitted frequency substantially cancel one another such that only signals at the Doppler shifted frequencies are passed to the output of the differential amplifier circuit.

The output of the differential amplifier is connected to an input of a low pass amplifier tuned to pass only signals within a predetermined frequency range, such as the frequency range of Doppler signals which will be produced as the result of a human motion. The signals passed by the low pass amplifier in turn control an alarm indicating circuit which provides an alarm indication whenever Doppler signals indicative of human motion within the protected area are received by the Doppler radar apparatus.

DESCRIPTION OF A PREFERRED EMBODIMENT

Figure 1:
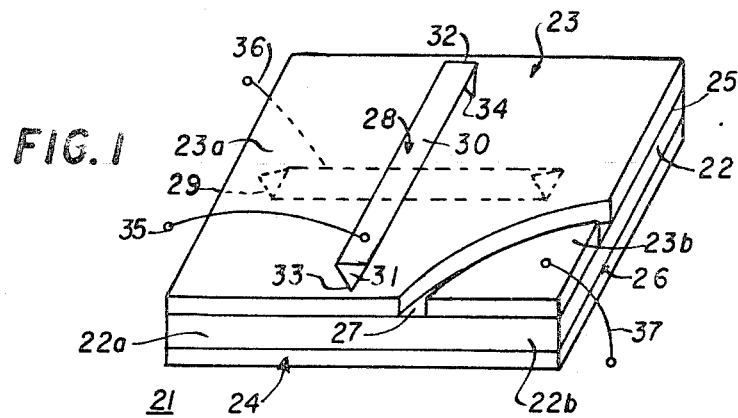
FIG. 1 is an isometric view of a piezoelectric acoustical transducer including a first embodiment for a piezoelectric element provided by the present invention.

Referring to FIG. 1, there is shown an isometric view of an acoustic transducer 21 provided by the present invention. In one embodiment, the transducer 21 is comprised of a generally rectangularly shaped piezoelectric element 22. Many different piezoelectric materials are commercially available for use in acoustical transducers, and the piezoelectric element used in the present application may, for example, be Barium Titanate or Lead Zirconium Titanate.

The piezoelectric element 22 has electrodes 23 and 24 of electrically conductive material disposed on surfaces 25 and 26, respectively, of the element 22. The conductive electrode 23 on surface 25 has an isolating channel 27 which divides electrode 23 into two electrically isolated electrode portions. The area of electrode portion 23a may, for example, be approximately five times larger than the area of electrode portion 23b.

Figure 1A:
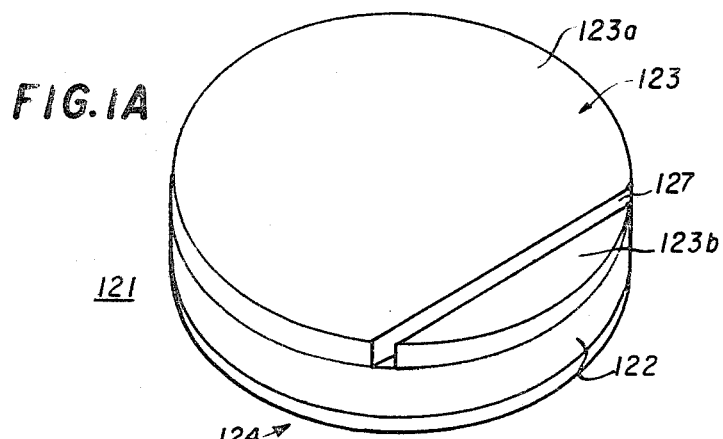
FIG. 1A is an isometric view of a second embodiment for a piezoelectric element for use in the acoustical transducer shown in FIG. 1.

While for purposes of illustration, the transducer 21 is shown to include a rectangular piezoelectric element 22, it is pointed out that other configurations may also be used for the element 22. For example, referring to FIG. 1A, there is shown a circular shaped piezoelectric element 122 having metalized surfaces 123 and 124. An acoustical transducer employing a piezoelectric element having this configuration is commercially available from Vernitron Piezoelectric Division of Bedford, Ohio, and is described in their Bulletin 93001.

However, in accordance with the present invention, this commercially available transducer is modified by removing a strip of conductive material from the metalized surface 123 to form a channel 127 on metalized surface 123 to thereby provide two discrete electrical conductive areas 123a and 123b, which serve as input and output electrodes respectively, for the transducer 121.

Referring again to FIG. 1, the transducer 21 is adapted to be mounted in a suitable casing (not shown) through the use of mechanical support members including support member 28 adjacent conductive surface 23, and support member 29 (shown by dotted lines), located adjacent conductive surface 24. Each support member, such as support member 28, includes a rectangular base portion 30 extending generally parallel to the surface of element 22 and having a pair of triangularly shaped end members 31 and 32 extending at right angles to the base portion 30, with apexes 33 and 34, respectively, contacting the metalized surface 23a of the element 22. When the transducer 21 is mounted in a case, the support members 28 and 29 clamp the element 22 in place while minimizing restriction of movement of the element 22 whenever the element is energized.

Electrodes 23a and 24 serve as input electrodes providing an input circuit for the transducer 21 to receive drive signals and electrodes 23b and 24 serve as output electrodes providing an output circuit for the transducer 21, electrode 24 being common to both the transducer input and output circuits.

The support members 28 and 29 are of an electrically conductive material to facilitate connection of the electrodes 23a and 24 to an energizing source. Suitable conductors 35 and 36 may be connected between the support members 28 and 29, respectively, and a source of drive signals. A further conductor 37 may be connected directly to the electrode 23b to enable connection of electrode 23b to a signal detecting circuit.

In accordance with the principles of the piezoelectric effect, whenever a drive signal is applied between the input electrodes 23a and 24 (via conductors 35 and 36), an electrical field will be produced between electrodes 23a and 24 including the portion of the piezoelectric element 22 between such electrodes 23a and 24. As a result of such applied EMF, the piezoelectric element 22 will be distorted, that is, the element 22 will change in length and thickness. Assuming that an AC EMF is applied between the input electrodes 23a and 24, then as the element 22 flexes on the conductive supports 28 and 29, the movement of the element 22 will effect the generation of acoustical signals which are radiated from the element 22, and thus, the element 22 acts as an acoustical transmitter. Alternatively, acoustical signals which impinge on the element 22, will cause the element 22 to flex, producing an electrical signal across the output electrodes 23b and 24 (and conductors 36 and 37), and thus, the element 22 acts as an acoustical receiver. It is obvious that an electrical signal is also produced across the output electrodes 23b and 24 due to the movement caused by the aforementioned applied EMF.

In accordance with the present invention, the transducer 21 is used as both an acoustical transmitter and an acoustical receiver to simultaneously transmit and receive acoustical signals. The portion 22a of the element adjacent electrodes 23a and 24 serves as an acoustical transmitter, and the portion 22b of the element 22, adjacent electrodes 23b and 24 serves as an acoustical receiver.

Figure 2:
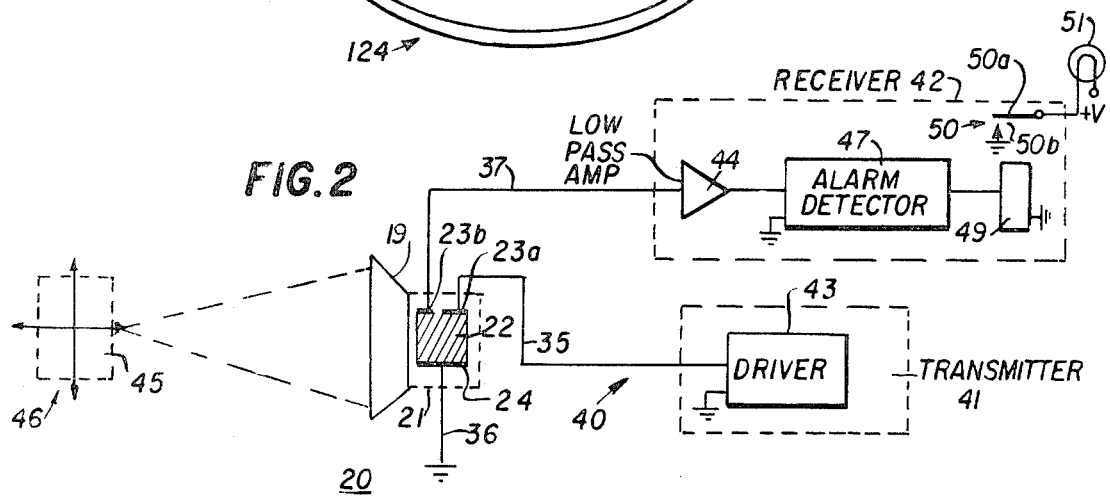
FIG. 2 is a schematic representation of a first embodiment for a Doppler radar motion detection system including a piezoelectric acoustical transducer provided by the present invention.

The transducer 21 may, for example, be used in systems wherein non-contact detection of motion, object presence or other sound-field disturbances is required. In an exemplary embodiment, the transducer 21 is employed in an intrusion detection system 20, shown schematically in FIG. 2, for detecting unauthorized movements of an object 45, such as a human intruder, within a protected area, indicated generally at 46.

The intrusion detection system 20 includes Doppler motion detection apparatus 40 having a transmit section 41 and a receive section 42. The transducer 21, shown schematically in FIG. 2, has an input electrode 23a connected over a conductor 35 to the output of a drive circuit 43 of the transmitting section 41 of the motion detection apparatus 40. The common conductor electrode 24 is connected via conductor 36 to ground or a point of reference potential for the motion detection apparatus 40.

The output electrode 23b of transducer 21 is connected over a conductor 37 to the input of frequency responsive signal processing apparatus of the receive section 42 of the motion detection apparatus 40.

The drive circuit 43 may comprise a signal generator which provides drive signals at an ultrasonic frequency, such as 26KHz, for the transducer 21 causing the piezoelectric element 22 of the transducer 21 to vibrate at a 26KHz rate to thereby generate acoustical signals for radiation into the protected area 46. The transducer 21 may include suitable acoustical signal directing device, such as a cone 19, to facilitate focusing of the acoustical energy where required.

In accordance with the Doppler effect, whenever a moving body 45 is within the protected area 46, the ultrasonic signals radiated into the area 46 which are reflected off the moving body 45 will be shifted in frequency, producing Doppler shifted signals related in frequency to characteristics of the object moving within the protected area. The Doppler signals provided as a result of human movement, for example, are typically shifted by an amount in the range of 20 to 300 Hz, when a 26 KHz transmitting source is employed.

The Doppler shifted frequency signals thus produced are reflected back to the location of the transducer 21, along with signals at the transmitted frequency which may be reflected off immobile objects within the protected area. When such reflected signals impinge on the receiving portion of the transducer 21, electrical signals at the frequency of the reflected signals will be provided at the output electrode 23b. In the exemplary embodiment, wherein the intrusion detection system 20 is employed to detect unauthorized movements of a human intruder with the area protected by the system, the frequency responsive signal processing apparatus of the receive section 42 includes a low pass amplifier circuit 44 tuned to pass only signals of frequencies in the range of 20–300 Hz, in the exemplary embodiment, as may result from human movement.

It is pointed out that the low pass amplifier 44 preferably has a high input impedance characteristic to enable the detection of the output signals produced at the output electrode 23b as the result of acoustical signals reflected back to the transducer 21. The output signals produced at the output electrode 23b will be lower in amplitude than the drive signals applied to the input electrode 23a.

It is advantageous to employ a larger portion of the conductive area of the transducer 21 for transmitting acoustical energy so as to maintain a relatively high transmitting efficiency for the transducer 21. Any decrease in the amplitude of the output signals produced at the output electrode 23b is effectively compensated for through the use of the high input impedance amplifier 44.

The receive section 42 of the motion detection apparatus 40 further includes an alarm detecting circuit 47 connected to the output of the low pass amplifier 44. The alarm detecting circuit 47 may comprise a driver circuit including a switching circuit such as a Schmitt trigger circuit, which is responsive to input signals in excess of a predetermined amplitude to provide an output for energizing a control device, such as a relay 49. The relay 49 has a pair of normally open contacts 50, including a contact 50a connected over an alarm lamp 51, or some other indicating device such as a bell, a buzzer, etc. to a source of potential + V, and a contact 50b connected to ground. If desired, the alarm detecting circuit 47 may include a suitable latch circuit operable when enabled to maintain the relay 49 energized until the latch circuit is manually reset.

In operation, the piezoelectric acoustical transducer 21 is driven by ultrasonic signals provided by the drive circuit 43, radiating ultrasonic signals into the protected area 46. Under normal conditions, that is, when an intruder is not present within the protected area 46, the acoustical signals reflected back to the location of the transducer 21 will be at the frequency of the transmitted signals, and will be ineffective to produce an alarm indication.

On the other hand, whenever an unauthorized intruder is moving within the protected area 46, ultrasonic signals radiated into the protected area 46, which are reflected off the intruder 45 will be shifted in frequency by the well known Doppler effect. Such Doppler shifted signals, when reflected back to the transducer 21, will cause the generation of electrical signals at the Doppler frequencies to appear at the output electrode 23b of the transducer 21. The received Doppler frequency signals are extended from electrode 23b over conductor 37 and the low pass amplifier 44, to the input of the alarm detecting circuit 47. Alarm detecting circuit 47 is responsive to such signals to energize relay 49, closing contacts 50 and lighting lamp 51 to indicate an unauthorized intrusion of the protected area.

Figure 3:
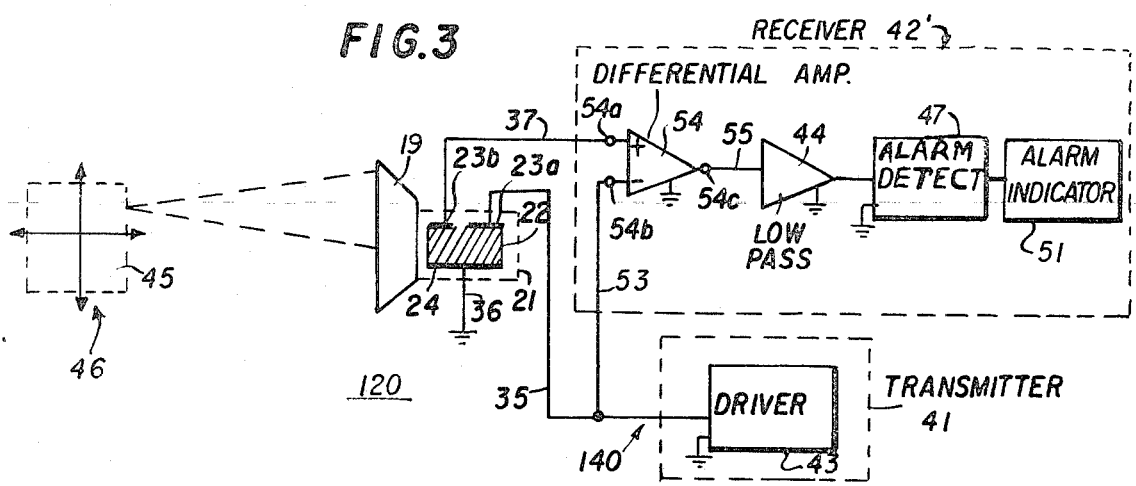
FIG. 3 is a schematic representation of a further embodiment of a Doppler radar motion detection system including a piezoelectric acoustical transducer provided by the present invention.

Referring to FIG. 3, there is shown a second embodiment for an intrusion detection system 120 employing the piezoelectric acoustical transducer 21 shown in FIG. 1. This particular embodiment incorporates portions of the motion detection apparatus 40 shown in FIG. 2 and such portions are correspondingly numbered.

The intrusion detection system 120 includes Doppler motion detection apparatus 140 having a transmit section 41 including a drive circuit 43 and a receive section 42' including a differential amplifier 54, a low pass amplifier 44 and an alarm detecting circuit 47.

The output of the drive circuit 43 is connected to the input electrode 23a of the acoustical transducer 21. The output electrode 23b of the transducer 21 is connected over conductor 37 to one input 54a of the differential amplifier 54. A second input 54b of the differential amplifier 54 is connected over a conductor 53 to the output of the drive circuit 43. The output of the differential amplifier 54 at terminal 54c is connected over a conductor 55 to the input of the low pass amplifier 44, which in turn has an output connected to the input of the alarm detecting circuit 47.

The differential amplifier 54 may be embodied as a common mode rejection amplifier. The addition of the common mode rejection amplifier 54 to the receiver 42' enhances the sensitivity of the receiver 42' by offsetting reflected signals at the transmitted frequency which are detected by the transducer 21 by out-of-phase signals at the transmitted frequency which are coupled directly to the common mode rejection amplifier circuit 54 from the output of the drive circuit 43.

Figure 4:
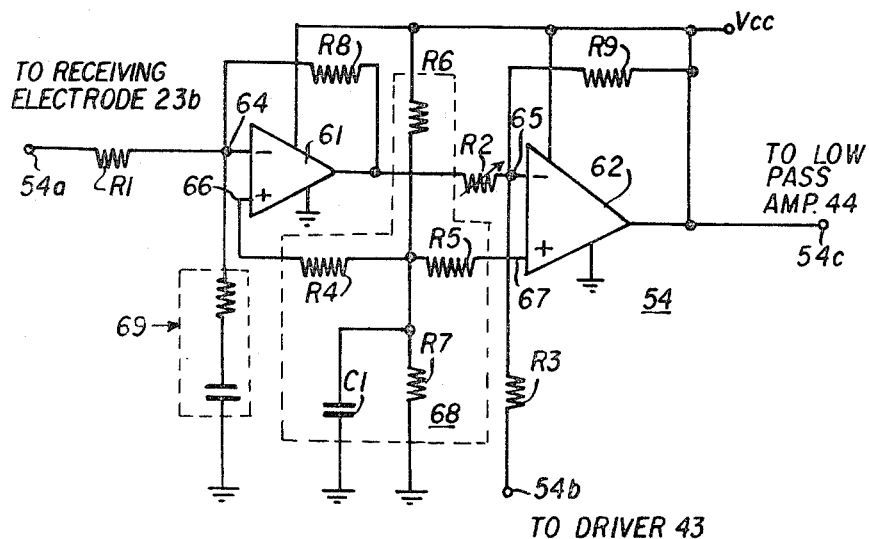
FIG. 4 is a schematic circuit diagram of a common mode rejection amplifier circuit for use in the motion detection system shown in FIG. 3.

Referring to FIG. 4, there is shown a schematic circuit diagram of one embodiment for a common mode rejection amplifier circuit 54 suitable for use in the present application. The amplifier 54 includes an input stage operational amplifier 61 having a negative input 64 connected over a resistor R1 to an input terminal 54a of the amplifier circuit 54. As shown in FIG. 3, terminal 54a is connected over conductor 37 to the output electrode 23b of the transducer 21. The output of amplifier 61 is connected over a variable resistor R2 to a negative input 65 of an output stage operational amplifier 62. The resistor R2 serves to provide a common mode rejection adjustment for the amplifier circuit 54. The negative input 65 of output amplifier 62 is also connected over a resistor R3 to a second input terminal 54b of the amplifier circuit 54. Input terminal 54b is connected over conductor 53 to the output of the ultrasonic drive circuit 43 as shown in FIG. 3. The output of amplifier 62 is connected to an output terminal 54c of the amplifier circuit 54 which is extended over conductor 55 to the input of low pass amplifier 44.

The positive inputs 66, 67 of the operational amplifiers 61 and 62 are connected to a point of reference potential over a bias network 68 including resistors R4-R7 and a capacitor C1.

Operational amplifier 61 and 62 have associated feedback resistors R8 and R9, respectively, connected from the output of respective amplifiers to the negative inputs of the amplifiers. A high frequency RC filter circuit 69 is connected from the negative input 64 of the amplifier 61 to ground.

In operation, reflected signals at both the transmitted frequency and Doppler frequencies which impinge on the transducer 21 produce electrical output signals between the output electrodes 23b and 24 of the transducer 21. Such signals are coupled over conductor 37 and resistor R1 to the negative input 64 of the operational amplifier 61. Amplifier 61 may, for example, have a voltage gain of −1.

Signals at the transmitted frequency from the drive circuit 43 are normally coupled over resistor R3 to the negative input 65 of output amplifier 62. Signals at both the Doppler frequencies and the transmitted frequencies are coupled over resistor R2 to the negative input 65 of the output amplifier 62. The signals passed by the input amplifier stage 61 are inverted and thus the signals at the transmitted frequency extended to the output stage amplifier 62 are 180° out of phase with the signals provided by drive circuit 43. Accordingly, the inverted signals at the transmitted frequency passed by amplifier 61 will be cancelled by the signals at the transmitted frequency extended to the input 65 of the amplifier 62 from the output of the drive circuit 43, and only signals at the Doppler frequencies will be passed by amplifier 62 to the low pass amplifier 44.

The Doppler signals thus passed by the differential amplifier 54 and the low pass amplifier 44 to the alarm detecting circuit 47 will enable the drive circuit to effect energization of the alarm indicator 51 to provide an indication of the detection of unauthorized movements within the protected area.

I claim:

1. In a motion detection system for detecting the presence of a human intruder moving within a protected area, a single piezoelectric element means having first and second opposing surfaces, input means electrically coupled to said first and second opposing surfaces adjacent a first portion of said piezoelectric element means for applying an AC electrical field to at least a first portion of said piezoelectric element means to effect the generation of acoustical signals of a first frequency for radiation into said protected area, at least certain ones of said acoustical signals being shifted in frequency to produce Doppler shifted signals of at least a second frequency whenever said certain acoustical signals are reflected off a human intruder moving within said protected area, at least certain ones of said Doppler shifted signals being reflected back to said piezoelectric element means to impinge on a second portion of said piezoelectric element means to thereby effect the generation of electrical output signals of at least said second frequency, and output means including signal processing means electrically coupled to said first and second opposing surfaces adjacent a second portion of sais piezoelectric element means, operable to pass only output signals within a predetermined frequency range which includes said second frequency, indicator means, and level detecting means responsive to output signals passed by said signal processing means which are in excess of a predetermined amplitude indicative of human motion to enable said indicator means to provide an indication of the detection of movement of a human intruder within the protected area.

2. A system as set forth in claim 1 wherein said input means includes first conductive means disposed on said first surface adjacent the first portion of said element means and second conductive means disposed on said second surface at least adjacent the first portion of said element means, and signal generating means for providing AC drive signals at said first frequency, said signal generating means having an output circuit connected between said first and second conductive means for extending said drive signals to said first and second conductive means to provide an AC potential difference, and thus produce an AC electrical field, between said first and second conductive means.

3. A system as set forth in claim 2 wherein said output means further includes third conductive means disposed on said first surface adjacent to the second portion of said piezoelectric element means, said electrical output signals being produced between said third conductive means and said second conductive means, and signal processing means having an input circuit connected between said third conductive means and said second conductive means to receive said output signals.

4. A system as set forth in claim 1 wherein said signal processing means includes differential amplifier means having first and second stages, means connecting an input of said first stage to said second portion of said piezoelectric element means for receiving the output signals of said first and second frequencies, said first stage being operable to provide inverted output signals of said first and second frequencies at an output thereof, means connecting the output of said first stage to an input of said second stage to extend said inverted output signals of said first and second frequencies to said input of said second stage, and means connecting an output of said input means to said input of said second stage to extend signals of said first frequency provided by said input means to said input of said second stage to thereby cancel the inverted output signals of said first frequency extended to said input of said second stage from the output of said first stage.

5. In a motion detection system for detecting the presence of a moving body within a protected area, acoustical transducer means including a piezoelectric element having first and second opposing surfaces, first conductor means disposed on a portion of said first surface, second conductor means disposed on a further portion of said first surface, and third conductor means disposed on said second surface, signal generating means having an output circuit connected between said first and third conductor means for extending drive signals of a first frequency to said transducer means, the portion of said piezoelectric element adjacent said first conductor means being responsive to the drive signals supplied thereto to generate acoustical signals of said first frequency for radiation into said protected area, at least certain ones of said acoustical signals being shifted in frequency to produce Doppler shifted signals of at least a second frequency whenever said certain acoustical signals are reflected off a moving body within the protected area, the portion of said piezoelectric element adjacent said second conductor means being responsive to Doppler shifted signals reflected thereto to produce output signals of at least said second frequency between said second conductor means and said third conductor means, and signal processing means including differential amplifier means having first and second stages, means connecting an input of said first stage to said second conductor means for receiving the output signals of said first and second frequencies produced at said second conductor means, said first stage being operable to provide inverted output signals of said first and second frequencies at an output thereof, means connecting the output of said first stage to an input of said second stage to extend said inverted output signals of said first and second frequencies to said input of said second stage, and means connecting the output circuit of said signal generating means to said input of said second stage to extend signals of said first frequency provided by said signal generating means to said input of said second stage to thereby cancel the inverted output signals of said first frequency extended to said input of said second stage from the output of said first stage, said signal processing means being operable to pass only signals of frequencies within a predetermined range including said second frequency, and indicator means enabled by signals passed by said signal processing means to provide an indication of the detection of a moving body within the protected area.

6. A system as set forth in claim 5 wherein the surface area of said first conductor means is greater than the surface area of said second conductor means and wherein said frequency responsive signal processing means comprises a high input impedance amplifier circuit.

7. In a motion detection system for detecting the presence of a human intruder moving within a protected area, acoustical transducer means including a single piezoelectric element means, input means for applying an AC electrical field to a first portion of said piezoelectric element means to effect the generation of acoustical signals of a first frequency for radiation into said protected area, at least certain ones of said acoustical signals being shifted in frequency to produce Doppler shifted frequency signals of at least a second frequency whenever said certain acoustical signals are reflected off a human intruder moving within said protected area, at least certain ones of said Doppler shifted signals being reflected back to said piezoelectric element means to impinge on a second portion of said piezoelectric element means to thereby effect generation of electrical output signals of at least said second frequency, differential amplifier means having first and second stages, means connecting an input of said first stage to said second portion of said piezoelectric element means for receiving the output signals of said first and second frequencies, said first stage being operable to provide inverted output signals of said first and second frequencies at an output thereof, means connecting the output of said first stage to an input of said second stage to extend the inverted output signals of said first and second frequencies to said input of said second stage, and means connecting the output of said input means to said input of said second stage to extend signals of said first frequency provided by said output means to said input of said second stage to thereby cancel the inverted output signals of said first frequency extended to said input of said second stage from the output of said first stage whereby said differential amplifier means passes only signals of said second frequency to an output thereof and to preclude passage of signals at said first frequency to the output thereof, and means connected to an output of said differential amplifier means and responsive to output signals at said second frequency provide an indication of the detection of movement of a human intruder within the protected area.

8. In a motion detection system for detecting the presence of a human intruder moving within a protected area, a piezoelectric element having first and second opposing surfaces, first conductor means disposed on said first surface said first conductor means being scored to provide first and second electrically isolated electrodes on said first surface, said first electrode having a surface area approximately five times the surface area of said second electrode, and second conductor means disposed on said second surface to provide a common electrode, signal generating means having an output circuit connected between said first electrode and said common electrode for extending drive signals of a first frequency to said piezoelectric element, the portion of said piezoelectric element adjacent said first electrode being responsive to the drive signals supplied thereto to generate acoustical signals of said first frequency for radiation into said protected area, at least certain ones of said acoustical signals being shifted in frequency to produce Doppler shifted signals of at least a second frequency whenever said certain acoustical signals are reflected off a human intruder moving within the protected area, the portion of said piezoelectric element adjacent said second electrode being responsive to Doppler shifted signals reflected thereto to produce output signals of at least second frequency between said second conductor means and said third conductor means, and signal detecting means having an input circuit connected between said second electrode and said common electrode, said signal detecting means being responsive to output signals of said second frequency to provide an indication of the detection of movement of a human intruder within the protected area.

9. A system as set forth in claim 8 wherein said signal detecting means includes differential amplifier means having an inverting input connected to said second electrode to receive the output signals at said first and second frequencies produced at said second electrode, and a non-inverting input connected to the output circuit of said signal generating means to receive signals at said first frequency provided by said signal generating means, and an output, said differential amplifier means being operable to inversely add the output signals at first and second frequencies extended to the inverting input to the signals at said first frequency extended to the non-inverting input to thereby pass output signals at said second frequency to the output thereof and preclude passage of signals at said first frequency to the output thereof, and indicator means connected to the output of said differential amplifier means and responsive to output signals at said second frequency to provide said indication.

* * * * *